(12) United States Patent
Cuerrier Auclair et al.

(10) Patent No.: US 10,156,068 B2
(45) Date of Patent: Dec. 18, 2018

(54) BUILT-UP SYSTEM, CONNECTOR THEREOF, AND METHOD OF MAKING SAME

(71) Applicant: UNIVERSITÉ LAVAL, Québec (CA)

(72) Inventors: Samuel Cuerrier Auclair, Québec (CA); Luca Sorelli, Quebec (CA); Alexander Salenikovich, Quebec (CA)

(73) Assignee: UNIVERSITÉ LAVAL, Quebec (CA)

( * ) Notice: Subject to any disclaimer, the term of this patent is extended or adjusted under 35 U.S.C. 154(b) by 0 days.

(21) Appl. No.: 15/514,958

(22) PCT Filed: Sep. 29, 2015

(86) PCT No.: PCT/CA2015/050976
§ 371 (c)(1),
(2) Date: Mar. 28, 2017

(87) PCT Pub. No.: WO2016/049758
PCT Pub. Date: Apr. 7, 2016

(65) Prior Publication Data
US 2017/0218624 A1    Aug. 3, 2017

Related U.S. Application Data

(60) Provisional application No. 62/057,399, filed on Sep. 30, 2014.

(51) Int. Cl.
*F16B 15/00* (2006.01)
*E04B 5/26* (2006.01)
(Continued)

(52) U.S. Cl.
CPC ............. *E04B 5/263* (2013.01); *E04B 5/23* (2013.01); *E04B 5/17* (2013.01); *E04B 5/26* (2013.01);
(Continued)

(58) Field of Classification Search
CPC ...... E04B 1/48; E04B 2005/237; E04B 1/161; E04B 2005/232; E04C 2/044; E04C 2/292; E04C 5/07; E04C 3/29; E04C 2/26
(Continued)

(56) References Cited

U.S. PATENT DOCUMENTS 2,163,889 A * 6/1939 Podd .................. E04C 5/18
52/679
2,268,311 A * 12/1941 Sheehan .................. E04B 5/29
52/328
(Continued)

FOREIGN PATENT DOCUMENTS

DE    9017564 U1    3/1991
EP    1013840 B1    3/2002
(Continued)

OTHER PUBLICATIONS

Leander A. Bathon et al., "Concrete bearings—a new design approach in wood-concrete-composite applications", pp. 1-4, 2006, Germany.
(Continued)

*Primary Examiner* — Gisele D Ford
(74) *Attorney, Agent, or Firm* — Norton Rose Fulbright Canada LLP; Alexandre Daoust (57) ABSTRACT

A connector for connecting a wood substrate to a concrete layer. The connector comprising a shank adapted to engagement with a bore in the wood substrate with a length of the shank aligned with a central axis of the bore, the shank having at least an external portion made of a cement-based composition. In the built-up system, the connectors can have transversal ductile collapse characteristics providing a structural ductility of at least 50% to the built-up system with the wood substrate and concrete layer maintaining an elastic behavior upon the transversal ductile collapse of the plurality of connectors.

24 Claims, 7 Drawing Sheets

(51) Int. Cl.
*E04B 5/23* (2006.01)
*F16B 13/00* (2006.01)
*E04B 5/17* (2006.01)

(52) U.S. Cl.
CPC ... *E04B 2005/235* (2013.01); *E04B 2005/237* (2013.01); *F16B 13/00* (2013.01)

(58) Field of Classification Search
USPC .......................................... 411/902, 82, 81.1
See application file for complete search history.

(56) References Cited

U.S. PATENT DOCUMENTS

| | | | | |
|---|---|---|---|---|
| 4,841,703 | A * | 6/1989 | Grimaud | E04B 1/48 52/334 |
| 5,125,200 | A * | 6/1992 | Natterer | E04B 5/23 52/223.8 |
| 5,561,957 | A * | 10/1996 | Gauthier | E04B 5/23 52/332 |
| 5,809,722 | A * | 9/1998 | Bertsche | E04B 5/14 52/262 |
| 6,305,135 | B1 * | 10/2001 | Inaba | B32B 3/30 52/309.12 |
| 6,581,346 | B2 * | 6/2003 | Melland | E04B 5/23 52/334 |
| 7,281,357 | B2 | 10/2007 | Femminella | |
| 7,338,243 | B2 * | 3/2008 | Gerhard | B21K 1/44 408/230 |
| 8,245,470 | B2 | 8/2012 | Bathon et al. | |
| 8,590,239 | B2 * | 11/2013 | Bathon | E04B 7/22 52/167.4 |
| 9,708,778 | B2 * | 7/2017 | Messina | E01C 11/06 |
| 2004/0074183 | A1 * | 4/2004 | Schneider, III | E01D 19/125 52/334 |
| 2004/0118063 | A1 * | 6/2004 | Shidler | E04C 2/246 52/309.11 |
| 2005/0086906 | A1 * | 4/2005 | Bathon | E04B 5/04 52/782.1 |
| 2012/0066988 | A1 * | 3/2012 | Muttoni | E04C 5/0645 52/223.14 |
| 2013/0160393 | A1 * | 6/2013 | Steinmetz | E04C 5/00 52/704 |
| 2014/0030481 | A1 * | 1/2014 | Strauch | E04B 5/12 428/138 |
| 2015/0292543 | A1 * | 10/2015 | Gottlich | F16B 13/141 411/82 |

FOREIGN PATENT DOCUMENTS

| | | |
|---|---|---|
| EP | 0832336 B1 | 10/2002 |
| EP | 1582644 A1 | 10/2005 |
| EP | 1314828 B1 | 9/2007 |
| EP | 2450497 A2 | 5/2012 |
| EP | 2417310 B1 | 1/2013 |
| WO | 9411589 A1 | 5/1994 |

OTHER PUBLICATIONS

Chao Zhang, "Analysis of the Timber-Concrete Composite Systems with Ductile Connection", A thesis submitted in conformity with the requirements for the degree of Master of Applied Science, Graduate Department of Civil Engineering, University of Toronto, all pages, 2013.

Andrew Robert Lehan, "Development of a Slab-on-Girder Wood-Concrete-Composite Highway Bridge", A thesis submitted in conformity with the requirements for the degree of Master of Applied Science, Graduate Department of Civil Engineering, University of Toronto, all pages, 2012.

Richard M. Gutkowski et al., "Investigation of Notched Composite-Wood-Concrete Connections", pp. 1553-1561, Oct. 2004, Journal of Structural Engineering—ASCE Library, United States.

Piero Glefi et al., "Stud Shear Connection Design for Composite Concrete Slab and Wood Beams", pp. 1544-1550, Dec. 2002, Journal of Structural Engineering, United States.

A. Linam et al., "Wood-Concrete Beam : A New Concept for Short Span Bridge Constructions", pp. 1-4, 2006, France.

* cited by examiner

BUILT-UP SYSTEM, CONNECTOR THEREOF, AND METHOD OF MAKING SAME

REFERENCE TO RELATED APPLICATION

This patent application claims priority of U.S. provisional Application Ser. No. 62/057,399, filed on Sep. 30, 2014, the contents of which are hereby incorporated by reference.

FIELD

The improvements generally relate to the field of construction and can more particularly be useful in the making of structures subjected predominantly to flexure, such as floors, roofs, shells or bridges.

BACKGROUND

Connecting a concrete layer to the wood substrate in a manner that shear stress is transferred there between is a known method of improving the structural resistance of the so formed built-up system. In the resulting system the two components act as a composite structure having greater section properties than the sum of the section properties of the two components taken independently. Various considerations influence the design of such built-up system. Perhaps the most important one of these is the performance of the structure, typically, in terms of amount of load it can support using a given amount of material and/or limited dimensions. However, the other considerations can be very significant as well, such as seismic performance and cost of the components or of their assembly for instance.

While built-up systems having connectors were satisfactory to a certain degree, there always remains room for improvement.

SUMMARY

Figure 4:
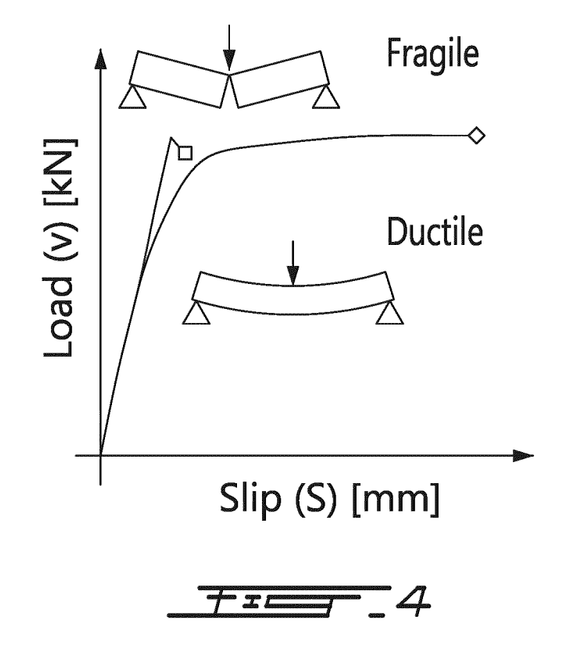
FIG. 4 is a schematical graph illustrating differences between a brittle material and a ductile material having a similar load capacity.

Ductility of structures is an important consideration. Ductility of a structure can be associated with an amount of visible deformation the structure can take while maintaining its load bearing capacity before breaking. For instance, FIG. 4 shows graphs of load vs. deflection of two structures. The first graph, ending with a break identified by a square mark, shows an elastic reaction until the maximum load where the structure suddenly breaks—a feature associated with a brittle structure. The second graph shows continued deformation for a prolonged period during which the structure maintains its capacity after reaching the limit of elasticity, ending ultimately with a break identified by a lozenge mark—a feature associated with a ductile structure. Both wood and concrete are relatively brittle materials, in the sense that they will break without significant deformation when subjected to bending. Such brittle behaviour is undesired in structures, and ductility is perceived as a safety measure (considered essential for constructions in most cases), which allows users of the structure to visually perceive a problem should, for any reason, a given actual load of the structure exceed its structural resistance. Ductility of a structure can also be relevant to redistribute forces between its components and/or dissipate energy (e.g. in the event of an earthquake or in redundant structures).

In the context of this specification, the ductility of a structure can be measured as the difference between the ultimate deflection ($\delta_u$) and the deflection at the limit of elasticity ($\delta_e$), the result normalized over the deflection at the limit of elasticity, so that:

$$\text{Structural ductility} = \frac{\delta_u - \delta_e}{\delta_e} \times 100.$$

Moreover, the skilled reader will appreciate the distinction between the material ductility, the connection ductility and the structural ductility. Ductile connections do not guarantee ductile structures. That is, a structure can fail in a brittle manner (ex. wood substrate collapses in tension or shear or concrete layer collapses in compression), while the connector is still behaving elastically without exploiting its ductility. This will be explained more clearly in the following paragraphs:

Considering a material under uniaxial loading, the material ductility can be defined as the difference between the ultimate deformation ($\varepsilon_n$) (it is noted here that deformation can alternately be referred to as strain) and the deformation at the end of elasticity ($\varepsilon_e$), the result normalized over the deformation at the end of elasticity ($\varepsilon_e$), so that $$\text{Material ductility} = \frac{\varepsilon_u - \varepsilon_e}{\varepsilon_e} \times 100.$$

Considering a "shear test" on a single connection comprising a concrete layer and a wood substrate, the connection ductility can be defined as the difference between the ultimate slip ($s_u$) between the two layers and the slip at the end of elasticity ($s_e$), the result normalized over the slip at the end of elasticity ($s_e$), so that $$\text{Connection ductility} = \frac{s_u - s_e}{s_e} \times 100.$$

where the slip is the displacement mismatch between the concrete layer and the wood substrate under the shearing force applied in a "shear test".

Considering a "shear-test" of a single connection comprising a concrete layer and a wood substrate, the connection stiffness can be defined as the initial slope of the curve of horizontal applied force (V) versus the slip between the layers (S). In this specification, the connection stiffness is associated to the estimation obtained by the following secant approximation as:

$$\text{Connection stiffness} \approx \frac{40\% \, V_{max} - 10\% \, V_{max}}{s_{V=40\% \, V_{max}} - s_{V=10\% \, V_{max}}} \times 100.$$

where force $V_{max}$ is the maximum force applied; $\delta_{V=10\% \, V_{max}}$ and $s_{V=40\% \, V_{max}}$ is the slip corresponding to an horizontal force of 10% and 40% $V_{max}$, respectively.

In general, the ultimate values (i.e., the ultimate deformation $\varepsilon_u$, the ultimate displacement slip $s_u$, and the ultimate displacement deflection $\delta_u$) are taken as those achieved at the moment of collapse (of a material, a connection or a structure). The collapse may occur at the maximum load or after softening, that is, when the force (or the stress) is reducing after achieving the maximum load while the displacement (or the deformation) is increasing. For the sake of clarity in the scope of this document, the ultimate values (i.e., the ultimate deformation $\varepsilon_u$, the ultimate slip $s_u$, and the ultimate deflection $\delta_u$) are defined as the value of displacement (or deformation) corresponding to the maximum load (or stress). Finally, the end of elasticity values (i.e., the end of elasticity deformation $\varepsilon_e$, the end of elasticity displacement slip $\delta_e$, and the end of elasticity displacement deflection $\delta_e$) are defined as the value of displacement (or deformation) where the slope of the curve load-displacement (or load-deformation) starts reducing significantly from its initial value. In the scope of this document, an arbitrary value of 10% of the slope is chosen as a significant reduction for identifying the end of elasticity point on the curve load-displacement (or load-deformation).

Example built-up systems with connectors described herein can address the issue of ductility of a structure. More particularly, connectors described herein can have a reasonable production cost and can allow a satisfactory amount of ductile slippage between a concrete layer and a wood substrate by bending in a ductile manner, thus maintaining the connection between the concrete layer and the wood substrate once deformed, and allowing the structure to behave in a ductile manner. Moreover, in an embodiment, the concrete layer, the connectors, the amount and locations of the connectors, and the wood substrate are designed in a manner that the wood substrate and concrete layer will both maintain an elastic behaviour upon the transversal ductile deformation of the connectors over the satisfactory amount of ductile slippage between the wood substrate and the concrete layer.

In accordance with one aspect, there is provided a connector for connecting a concrete layer to a wood substrate; the connector comprising a shank adapted to engagement with a bore in the wood substrate with a length of the shank aligned with a central axis of the bore, the shank having an external portion made of a cement-based composition and a core forming an internal portion and made of a material having at least 100% more ductility than the ductility of the cement-based composition forming the external portion, wherein the ratio of the length to the cross-sectional width of the shank is of at least 1.5 to 1, preferably at least 2 to 1, more preferably at least 3 to 1.

In accordance with one aspect, there is provided a connector for connecting a concrete layer to a wood substrate; the connector comprising a shank adapted to engagement with a bore in the wood substrate with a length of the shank aligned with a central axis of the bore, the shank having at least an external portion made of a fiber-reinforced cement-based composition.

In accordance with another aspect, there is provided a method of making built-up system comprising: providing a wood substrate; forming a plurality of interspaced bores in the wood substrate; pouring fresh concrete mix onto the wood substrate, wherein the fresh concrete mix penetrates into the bores; hardening the concrete including forming the concrete layer and forming a plurality of connectors having shanks protruding out from the concrete layer inside the bores.

In accordance with another aspect, there is provided a built-up system comprising: a wood substrate; a concrete layer juxtaposed with the wood substrate; and a plurality of connectors interspaced from one another and each being made integral to the concrete layer, protruding out from the concrete layer into the wood substrate, and having an outer layer of concrete composition; the connectors having transversal ductile collapse characteristics providing a structural ductility of at least 50% to the overlay system; wherein the wood substrate and concrete layer maintain an elastic behaviour upon the transversal ductile collapse of the plurality of connectors.

In accordance with another aspect, there is provided a method of operating a built-up system comprising the step of bending at least some of the connectors upon slippage between the concrete layer and the wood substrate while the concrete layer and the wood substrate remain in the linear deformation regime.

Many further features and combinations thereof concerning the present improvements will appear to those skilled in the art following a reading of the instant disclosure.

DESCRIPTION OF THE FIGURES

In the figures.

DETAILED DESCRIPTION

Figure 1:
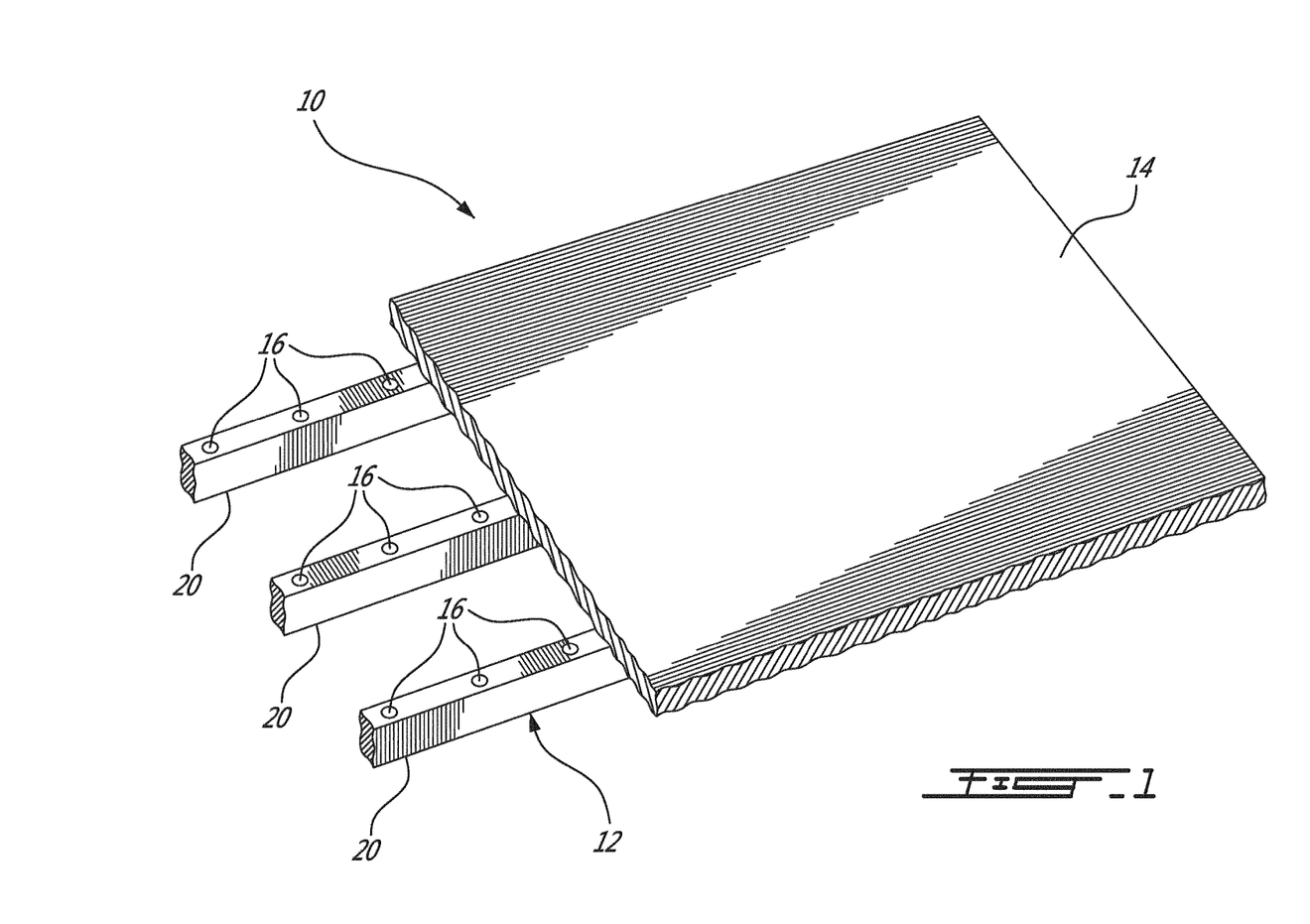
FIG. 1 is an oblique view of an example of an overlay system.

FIG. 1 shows an example of a built-up system 10 including a wood substrate 12 supporting a concrete layer 14. A plurality of bores 16 are present in the wood substrate 12 and a plurality of connectors 18 (embodiments of which are shown in FIGS. 2 and 3) which are made integral to the concrete layer 14 are snugly engaged into the bores 16 to transfer slippage stress between the concrete layer 14 and the wood substrate 12. In this embodiment, the wood substrate 12 is formed of a plurality of wood beams 20 (e.g. sawn lumber, glued laminated lumber or wood composite), though it will be understood that in alternate embodiments, the wood substrate 12 can be formed of a plate (e.g. cross-laminated timber [CLT], laminated veneer lumber [LVL], laminated strand lumber [LSL], etc.).

Figure 2A:
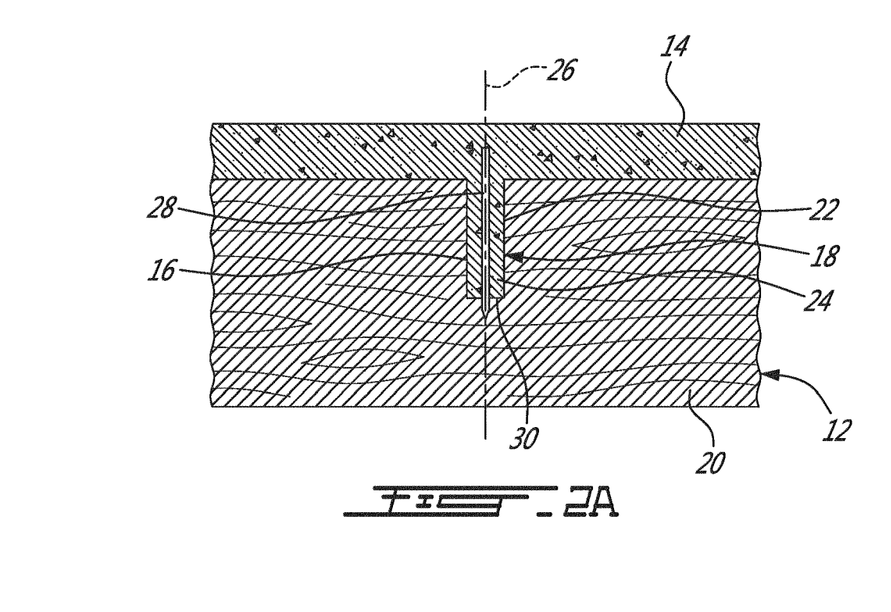
FIGS. 2A and 2B are a longitudinal and a transversal cross-section views, respectively, of a first embodiment of a connector in an overlay system.
Figure 2B:
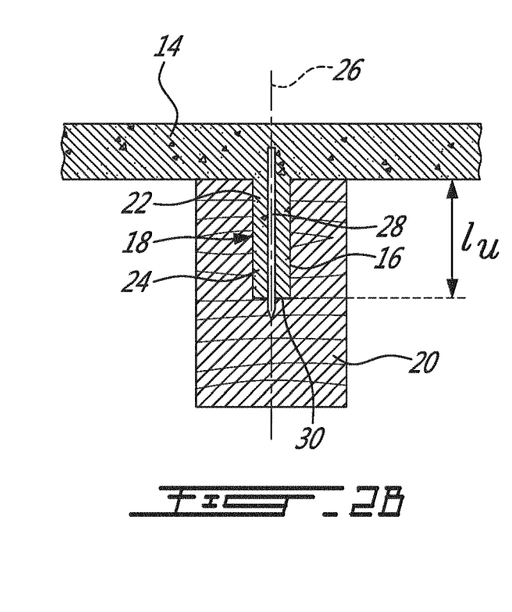
Figure 3A:
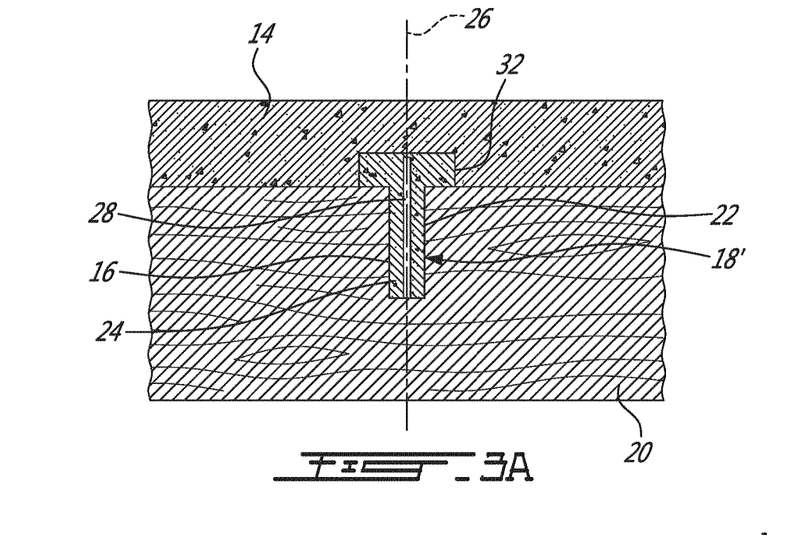
FIGS. 3A and 3B are a longitudinal and a transversal cross-section views, respectively, of a second embodiment of a connector in a built-up system.
Figure 3B:
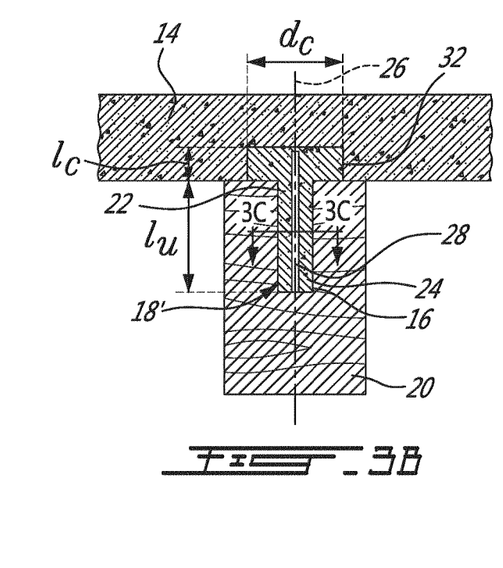
Figure 3C:
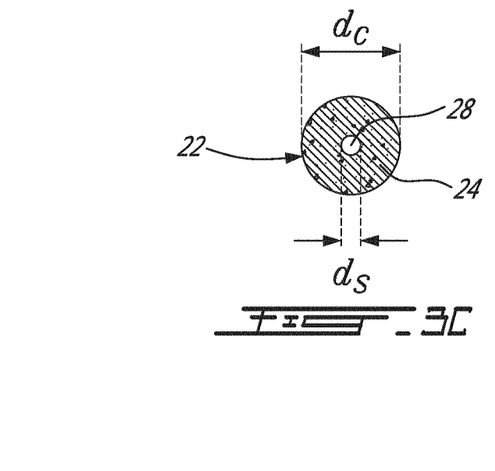
FIG. 3C is a cross-section view taken along lines 3C-3C of FIG. 3B.

FIGS. 2A and 2B show a first embodiment of a connector 18 whereas FIGS. 3A and 3B show a second embodiment of a connector 18'. Both embodiments of the connectors 18 and 18' have a shank 22 having an elongated bore-mating shape (e.g. a prong-like cylindrical shape or polygonal shape such as a rectangular or a hexagon prism having a size adapted to snugly engage the bore, where the bore itself can be cylindrical or of another shape such as a polygon formed by CNC machining to prevent rotation, for instance) with an external portion 24 thereof (i.e. transversally outer portion of the cross-section) being made of a cement based composition. In the illustrated embodiments, the shank 22 is snugly received into the bores 16 without void spaces between the shank 22 and the wood substrate 14. The length of the shank $l_u$ can be said to coincide with a penetration axis 26 of the bore 16. In both embodiments, the shank 22 is longer in the direction of the axis 26 of the bore 16 than in the cross-sectional direction, transversal to the axis 26 of the bore 16, and can operate predominantly in a bending manner upon slippage between the concrete overlay 14 and the wood substrate 12 as opposed to operating predominantly in a shear manner. It was found that favouring a flexural behaviour of the connector, associable to a 1D cantilever behaviour for instance, can provide for easier modeling, and thus design and selection of a connector, as compared to a shearing behaviour associable to a 2D shear mechanism. Both these embodiments of connectors 18 and 18' have a metal core 28 oriented centrally along the length of the shank 22, in coincidence with the axis 26 of the bore 16. It will be detailed below that the metal core 28 is optional but can be useful in some embodiments. In an alternate embodiment, the connector 18 can have a shank 22 made entirely of a fiber-reinforced mortar or a fiber-reinforced concrete, for instance.

The embodiment shown in FIGS. 2A and 2B is formed by pouring concrete onto the wood substrate 12 and into the pre-drilled bores 16, the concrete 14 then hardening inside the bores 16. If a metal core 28 is used, it can be positioned into the bore 16 beforehand, such as by driving into the bottom 30 of the bore 16, for instance. In this embodiment, the shank 22 is an extension of the concrete overlay 14 and typically has the same cement-based composition and the same transversally outer external shape with the shape of the bore 16.

The embodiment of the connector 18' shown in FIGS. 3A and 3B is prefabricated using a mould or the like. It is formed with a head 32, which can be of a different transversal cross-sectional shape and/or size than the transversal cross-sectional shape and/or size of the shank. For assembly of the overlay system 10, the shank 22 can be firmly engaged into the bores 16 (e.g. using a mallet if necessary) with the head 32 protruding out from the wood substrate 12, and the concrete overlay 14 can then be cast above it to be made integral with the head 30. Glue can be used to secure the engagement between the shank 22 and the walls of the bore 16 if desired. Although the shank 22 can have an extrusion-like projection shape along the penetration axis 26, whatever cross-sectional shape is selected, it can alternatively slightly taper from the head portion to the tip (e.g., as in being slightly conical) or chamfered near the tip in order to facilitate insertion.

It will be noted in the embodiments shown in FIGS. 2A, 2B, 3A, and 3B that the metal core 28 exceeds the shank 22 by protruding into the head 30 or into the body of the concrete layer 14.

Several shear-tests on different prefabricated connector configurations all having shanks with a circular cross-section shape and a length to width aspect ratio of 4:1 were conducted, outlined in Table 1 where the acronym "UHP-FRC" denotes "Ultra-high performance fiber-reinforced concrete" (e.g. BSI Eiffage™, Lafarge Ductal™). It will be noted here that this commonly used expression is used herein for simplicity although the expression UHPFRM "Ultra-high performance fiber-reinforced mortar" might well be more technically accurate, given the small sized aggregates typically used in these materials.

TABLE 1

Features of the tested connectors

| Test # | Type of cement-based material | Spacing between head and wood substrate | Shank diameter $d_c$ (mm) | Metal core and its diameter $d_s$ (mm) | Length of the shank $l_u$ (mm) |
| --- | --- | --- | --- | --- | --- |
| 1-2 | UHPFRC | 0 | 25 | 0 | 95 |
| 3-4 | UHPFRC | 0 | 25 | 5 - steel rod | 95 |
| 5 | Mortar | 0 | 25 | 5 - steel rod | 95 |
| 7-8 | UHPFRC | 0 | 25 | 10 - steel rod | 95 |
| 9-10 | UHPFRC | 0 | 25 | 10 - reinforcing steel bar | 95 |
| 11-12 | Mortar | 0 | 25 | 10 - steel rod | 95 |
| 13-14 | UHPFRC | 0 | 35 | 5 - steel rod | 135 |
| 15 | UHPFRC | 0 | 35 | 10 - steel rod | 135 |
| 16 | UHPFRC | 0 | 35 | 10 - reinforcing steel bar | 135 |

Figure 5A:
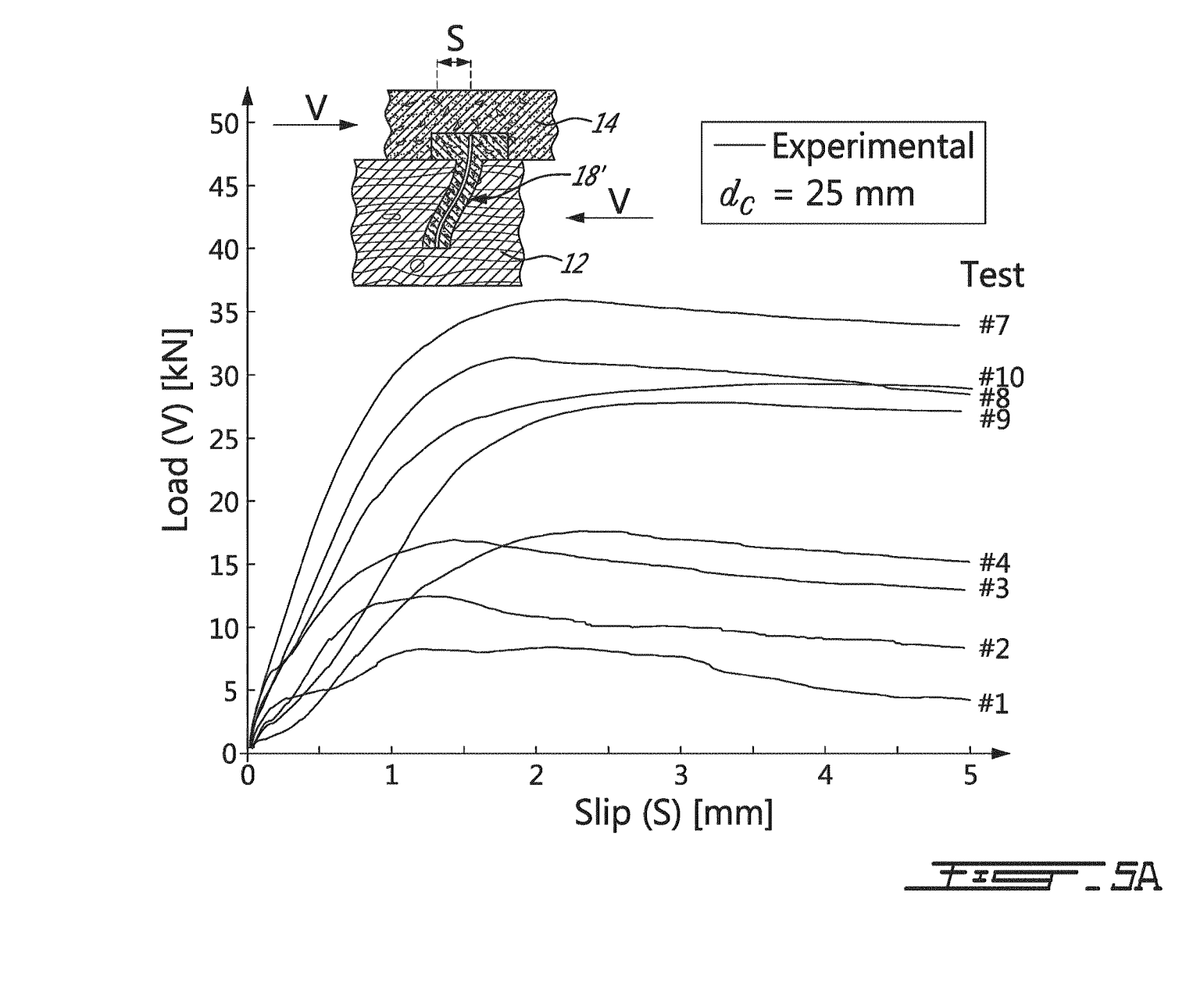
FIGS. 5A and 5B are graphs showing experimental results for tested connections.
Figure 5B:
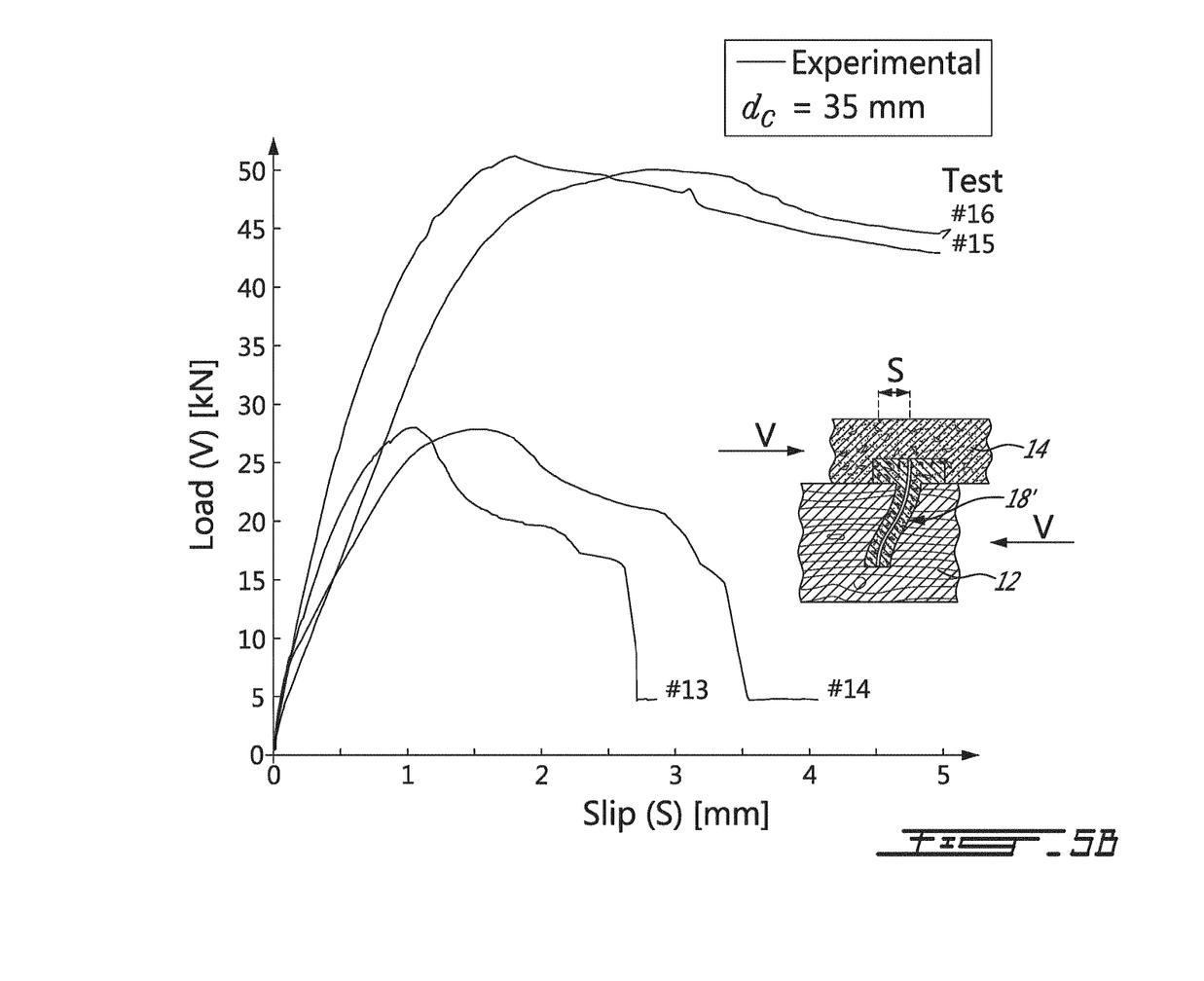

Results of these tests are represented in FIGS. 5A and 5B and summarized in Table 2. In those figures the external shank diameter is identified as $d_c$, while the external metal core diameter is identified as $d_s$. In the context of these tests, the expression 'steel rod' as used in Table 1 refers to plain steel, Class (Grade) 6 g thread fit, minimum Rockwell hardness of B49, minimum tensile strength of 58,000 psi (400 MPa). The expression 'reinforcing steel bar' refers to a steel bar of Grade 400 approved, which implies minimum yield strength of 400 MPa and minimum tensile strength of 500 MPa according to national standard CSA G30.18. With respect to the cement-based composition, as in many types of UHPFRC, the fibers used were steel micro fibers although it is noted here that polymer fibers can provide a suitable alternative in some embodiments.

TABLE 2

Results of the shear tests on the connectors described in Table 1

| Test # | Maximum load $F_{max}$ [kN] | Slip modulus $k_i$ [kN/mm] | Ultimate slip $\delta_u$ [mm] | Failure mode |
| --- | --- | --- | --- | --- |
| 1 | 8.44 | 22.4 | 3.0 | (1) |
| 2 | 12.42 | 13.5 | 5. | (1) |
| 3 | 16.93 | 28.6 | 7.4 | (1) |
| 4 | 17.59 | 11.8 | 7.7 | (1) |
| 5 | 4.15 | 18.1 | 9.7 | (2) |
| 6 | — | — | — | — |
| 7 | 35.95 | 37.0 | 12.1 | (1) |
| 8 | 31.36 | 26.2 | 11.2 | (1) |
| 9 | 27.85 | 14.4 | >15 | (3) |
| 10 | 29.00 | 21.6 | >15 | (3) |
| 11 | 20.38 | 19.9 | 12.9 | (2) |
| 12 | 19.73 | 8.8 | 12.6 | (2) |
| 13 | 28.06 | 48.0 | 1.1 | (1) |
| 14 | 27.82 | 36.3 | 1.8 | (1) |
| 15 | 51.24 | 52.8 | 12.0 | (1) |
| 16 | 50.11 | 29.9 | >15 | (1) |

The failure mode (1) relates to the shear failure of the connector and was observed most frequently. It represents the target failure mechanism, because it depends mostly on the properties of the prefabricated connector, which are better controlled and less variable than those of the connected members. The failure mode (2) relates to pull-out of the steel core from the connector head. The failure mode (2) was observed in connectors made with regular mortar, and it was accompanied with cracking in the concrete layer. The failure mode (3) relates to pull-out of the steel core from the connector shank. It was observed on connectors made with a reinforcing steel bar, and it was followed up with wood crushing produced by the withdrawn steel rod.

Most of these tests demonstrated a satisfactory amount of ductility over a slippage of more than 5 mm, often even over more than 10 mm slippage.

The inclusion of a core 28 of a ductile material such as steel (or of another material having comparable structural features, e.g. Kevlar) was often found favorable, and the core diameter $d_s$ can be considered as a significant factor for the strength and ductile behaviour of the connector beyond the limit of elasticity. However, even the connector of test #1 and #2, which did not have a metal core 28 but which used a fiber-reinforced concrete showed a ductility over more than 5 mm slippage, which may be considered satisfactory for some applications. It is thus understood that the use of reinforcing fibers in the cement-based composition can help achieve a satisfactory amount of ductility for use as a connector in some applications.

The results shown here indicate that the connection stiffness can be strongly correlated to the diameter of the external portion 24 of the shank 22 and that rigidity between 15 kN/mm and 30 kN/mm can be achieved depending on the external diameter.

With respect to the serviceability limit states, the connection stiffness allows limiting the deflection of the structure under a certain criterion, which depends on the span according to various codes.

The experimental results showed that the connector made of mortar and a steel core allows achieving a remarkable stiffness and a ductile behaviour of the connection beyond the elastic limit over more than 5 mm slip, and even further, beyond the elastic limit in excess of at least 500% over more than 20 mm slip.

The experimental results showed that the connector made of UHPFRC and steel core allows achieving a remarkable stiffness, a higher strength (40% higher than the case with mortar) and a ductile behaviour of the connection beyond the elastic limit in excess of 120-900% (herein called connection ductility), over more than 20 mm slip.

Numerical simulation using the Newmark differential equation, a well-recognized method, was conducted to predict the reaction of a plurality of connectors 18 or 18' in relation to a concrete layer 14 and wood substrate 12 of a built-up system 10 on various span lengths between 5 m and 50 m. The numerical simulation led us to believe that using these test results and further test results would allow to design a structure where the transversal ductile collapse (i.e. from ductile slippage between the wood substrate and the concrete overlay) characteristics of the connectors can be selected to achieve a structural ductility (in the overall system upon slippage) of at least 50%, preferably over 100%, while maintaining at least 50%, preferably at least 80% of the loading capacity that would be attained in the case of a 'theoretically perfect' ideally rigid connection that would not allow any slip to occur between the concrete layer 14 and the substrate, by selecting the wood substrate 12, the concrete layer 14 and the plurality of connectors 18 or 18' in a manner that the wood substrate 12 and concrete layer 14 maintain an elastic behaviour upon the transversal ductile collapse of the plurality of connectors 18 or 18'.

These simulations along with shear test analysis using the Winkler model, an applicable model for this purpose, were found suitable for a discrete elongated connector working in flexure like a beam on an elastic foundation. The material law of the UHPFRC in compression is described by the following equations:

$$\sigma = f'_c \frac{\epsilon}{\epsilon_{1,f}} \frac{\eta}{\left(\eta - 1 + \left(\frac{\epsilon}{\epsilon_{1,f}}\right)^{\eta\varphi}\right)}; \text{ where}$$

$$\epsilon_1 = \left[1 + 0.16\frac{k_0}{f'^2_c + 800}\right]\frac{f'^{2/3}_c}{k_0}; \epsilon_2 = \left[1 + \frac{20}{f'_c}\right]\epsilon_1; \epsilon_{1,f} = \left[1 + 4\frac{f_t}{f'_c}\right]\epsilon_1;$$

$$\epsilon_{2,f} = \left[1 + 15\frac{f_t}{f'_c}\right]\epsilon_2; X = \frac{\epsilon_{2,f}}{\epsilon_{1,f}}; \eta = \frac{k}{k-1}; k = E_c\frac{\epsilon_{1,f}}{f'_c};$$

$$k_0 = \frac{E_c}{f'^{1/3}_c}; \text{ and } \varphi = \begin{cases} 1 & \text{if } \epsilon < \epsilon_p \\ \frac{\ln(1 - \eta + \eta X/0.7)}{\eta \ln X} & \text{otherwise} \end{cases}.$$

The values of the strength in compression ($f_c'$) and tension ($f_t$) and on the Young's modulus ($E_c$) of the UHPFRC known from the literature were used in the shear test analysis. The tensile law of UHPFRC was determined by inverse analysis from third-point bending tests, which were carried out on four UHPFRC prismatic beams with a span of 1200 mm, height of 100 mm and width of 40 mm. The comparison between the experimental and calculated flexural behaviour of load vs. mid-span deflection shows satisfactory agreement. The material laws of the reinforcing steel bar and the threaded rods were experimentally determined from tensile tests according to ASTM E8 and the average curves based on three samples. The elastic stiffness of the Winkler model was considered to be $k_c$=10 GPa for concrete and $k_w$=1.3 GPa for wood. The non-linear performance parameters of the wood foundation were determined via linear interpolation of the results.

Figure 6:
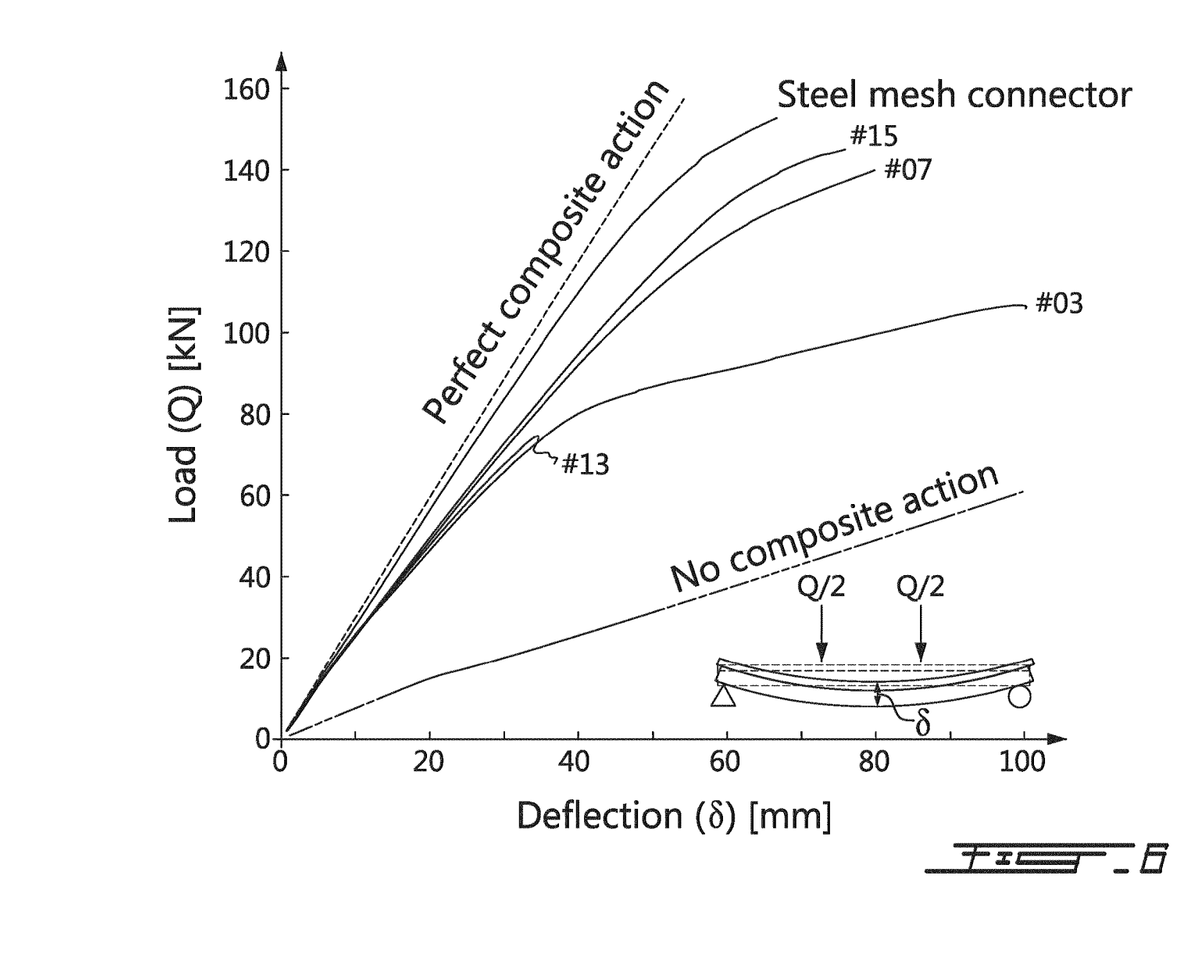
FIG. 6 is a schematic graph illustrating the notions of gain of structural ductility and loss of loading capacity compared to a theoretical case of a perfectly (ideally) rigid connection.

FIG. 6 shows an example of the calculated flexural response of the beams having the connectors in terms of load vs. mid-span deflection. The calculations predicted beam failure due to the wood rupture in tension at the exterior fibre except for the beam with connector #13 where the connectors would break first. The performance parameters of each analysed beam are presented in Table 3, where the flexural stiffness was calculated with γ-method and the ductility ratio (μ) was defined as follows:

$$\mu = \frac{v_u - v_e}{v_e},$$

where $v_u$ is the deflection at failure and $v_e$ is the limit of the elastic deflection.

TABLE 3

Performance parameters of beams for some of the connectors

| Test # | $d_c$ [mm] | Steel core | Spacing [mm] | $(EI)_{ef}$ [Nmm² · 10¹²] | $Q_{max}$ [kN] | $v_e$ [mm] | $v_u$ [mm] | μ [—] |
|---|---|---|---|---|---|---|---|---|
| steel mesh connector | — | — | — | 21.17 | 152 | 55.5 | 66.6 | 0.20 |

TABLE 3-continued

Performance parameters of beams for some of the connectors

| Test # | $d_c$ [mm] | Steel core | Spacing [mm] | $(EI)_{ef}$ [Nmm² · 10¹²] | $Q_{max}$ [kN] | $v_e$ [mm] | $v_u$ [mm] | μ [—] |
|---|---|---|---|---|---|---|---|---|
| 3 | 25.4 | M6 | 150 | 18.05 | 106 | 37.7 | 100.2 | 1.66 |
| 7 | 25.4 | M12 | 200 | 17.96 | 140 | 57.5 | 79.8 | 0.39 |
| 13 | 34.9 | M6 | 250 | 18.08 | 75 | 33.6 | 34.3 | 0.02 |
| 15 | 34.9 | M12 | 250 | 18.38 | 145 | 60.6 | 75.9 | 0.25 |

The results seem to confirm that by choosing the connector and the spacing, a designer can achieve desired stiffness, strength and ductility of a timber-concrete composite (TCC). TCC beams with similar flexural stiffness can have remarkably different strength and ductility ratios. The continuous steel mesh (see Table 3 and FIG. 6) provides nearly perfect composite action with #13 ($d_c$=35 mm and $d_s$=5 mm), which presents a rather brittle failure during the shear test, causes a brittle failure of the TCC beam at a very low load. This tends to confirm that a brittle connection would cause premature and brittle structural collapse. The connector #3 provides the highest ductility ratio to the beam with a reduction of the maximum load of about 30% with respect to the steel mesh connector. The beams with connectors #7 and #15 present lower ductility ratios, because the resistance of connectors was not completely achieved before the collapse of the timber. However, this example can demonstrate that using an appropriate composite connector as disclosed, for instance the connector #15, one can satisfactorily improve the structural ductility by only losing 15% of the flexural stiffness and the load bearing capacity of about 8% to the beam with continuous steel mesh connector.

As can be understood, the examples described above and illustrated are intended to be exemplary only. For instance, although the figures illustrate connectors which penetrate normal to the plane of the wood substrate are depicted, but it will be understood that in some embodiments, it can be preferred that the bores and connectors penetrate obliquely into the wood substrate. In the built-up system, the concrete layer can thus be said to be juxtaposed with the wood substrate independently of the orientation of these components and of whether the wood substrate abuts directly against the concrete layer, or whether these two components abut indirectly against one another, such as via an insulating layer or spacing for instance. Moreover, even though it will evidently be understood that the built-up system can be a horizontal structure such as a concrete floor or bridge deck, the built-up system can also be an obliquely oriented structure, or even a vertically oriented structure such as horizontally oriented connectors penetrating into a vertically oriented wood substrate, for instance. Accordingly, any use of the expressions layer or substrate in this specification has no intended connotation to a specific orientation. Further, the cross-sectional shape of the core can vary from one embodiment to another. For instance, a cylindrical shape (circular cross-section), a square cross-section or a hexagonal cross-section can be used depending on the embodiment. In some embodiments, the core can have a constant cross-section shape and size along its length (e.g. an extrusion shape), whereas in others the shape or size of the core cross-section can vary along its length. For instance, the core can have longitudinally interspaced ribs to better grip the cement composition of the external portion of the shank in one embodiment. The core can extend past the tip of the shank. For instance, if the core is a screw or a nail, and the connectors are formed in situ, the core(s) can be screwed or driven into the bottom of the bore prior to pouring the concrete. The core can be made of other types of materials than metal, which would present a significantly greater ductility than the ductility of the external portion of the shank. For instance, in a prefabricated embodiment, the core can be made of ECC (engineered cementitious composition). In this light, it will be better understood that the scope is indicated by the appended claims.

What is claimed is:

1. A connector for connecting a concrete layer to a wood substrate; the connector comprising an elongated shank adapted atoll for engagement with a bore in the wood substrate with a length of the shank aligned with a central axis of the bore, the shank having an external portion made of a fiber-reinforced cement-based composition, and a core surrounded by the external portion and forming an internal portion relative to the external portion, the core being made of a material having at least 100% more ductility than a ductility of the cement-based composition forming the external portion.

2. The connector of claim 1 wherein the material of the core is steel.

3. The connector of claim 1 wherein the core has a cross-sectional width of at least $\frac{1}{6}^{th}$ of a cross-sectional width of the shank and is provided centrally thereto.

4. The connector of claim 1 wherein a ratio of the length to a cross-sectional width of the shank is of at least 1.5 to 1.

5. The connector of claim 1 wherein the cement-based composition is an Ultra-High Performance Fiber Reinforced Concrete (UHPFRC).

6. The connector of claim 1 wherein the cement-based composition of the shank has fibers mainly oriented parallel to the length of the shank.

7. The connector of claim 1 wherein the shank tapers from a head to a tip.

8. The connector of claim 1 wherein the shank has a chamfered tip.

9. The connector of claim 1 wherein a diameter of the shank is of at least 15 mm.

10. The connector of claim 1 wherein the shank provides for a connection stiffness of at least 15 kN/mm.

11. The connector of claim 1 wherein the shank bends in a ductile manner with connection ductility of at least 120% over a slip range of 5 mm of relative movement between a concrete overlay and the wood substrate.

12. The connector of claim 1, provided in solid form and further comprising a head provided at one end of the shank for engagement with a concrete overlay into an integral shear connection configuration.

13. The connector of claim 12 wherein the head has a greater width than the shank.

14. The connector of claim 1 provided in the form of an extension to the concrete layer, wherein the cement-based composition is a concrete material of the concrete layer.

15. The connector of claim 4, wherein the ratio is of at least 2 to 1.

16. The connector of claim 9, wherein the diameter of the shank is between 20 and 50 mm.

17. The connector of claim 11, wherein the shank bends in a ductile manner with connection ductility of at least 120% over a slip range of 10 mm.

18. The connector of claim 11, wherein the shank bends in a ductile manner with connection ductility of at least 120% over a slip range of 15 mm.

19. A built-up system comprising:
a wood substrate;
a concrete layer juxtaposed with the wood substrate; and
a plurality of connectors interspaced from one another and each being made integral to the concrete layer, protruding out from the concrete layer into the wood substrate, and having an outer layer of concrete composition; the connectors having transversal ductile collapse characteristics providing a structural ductility of at least 50% to an overlay system; wherein the wood substrate and concrete layer maintain an elastic behaviour upon the transversal ductile collapse of the plurality of connectors.

20. The built-up system of claim 19 wherein a transversal rupture characteristics of the connectors provide a structural ductility of at least 100% to the built-up system while maintaining a loading capacity of the built-up system of at least 50%, compared to a theoretical case of an ideally rigid connection, wherein the theoretical case of the ideally rigid connection would not allow any slip to occur between the concrete layer and the wood substrate.

21. The built-up system of claim 20 wherein the transversal rupture characteristics of the connectors provide a structural ductility of at least 120% to the built-up system while maintaining a loading capacity of the built-up system of at least 80% compared to a theoretical case of an ideally rigid connection, wherein the theoretical case of the ideally rigid connection would not allow any slip to occur between the concrete layer and the wood substrate.

22. The built-up system of claim 19 wherein the wood substrate has a plurality of wood-based linear members.

23. The built-up system of claim 19 wherein the wood substrate has a plate layer receiving the concrete layer directly on an upper surface thereof.

24. The built-up system of claim 19 wherein the connectors are designed to bend upon slippage between the concrete layer and the wood substrate.

* * * * *